United States Patent [19]
Traut

[11] 4,278,304
[45] Jul. 14, 1981

[54] LINEAR BEARING DEVICES
[76] Inventor: Earl W. Traut, 8040 Palm Lake Dr., Orlando, Fla. 32811
[21] Appl. No.: 48,348
[22] Filed: Jun. 14, 1979
[51] Int. Cl.³ .............................................. F16C 29/04
[52] U.S. Cl. ....................................... 308/6 R; 308/3.8
[58] Field of Search ...................... 308/3 R, 3.8, 6 R
[56] References Cited
U.S. PATENT DOCUMENTS

| | | | |
|---|---|---|---|
| 3,093,424 | 6/1963 | Pernetta | 308/6 R |
| 3,471,668 | 10/1969 | Wilkes | 308/6 R |
| 3,641,296 | 2/1972 | Schwarz | 308/6 R |
| 3,929,387 | 12/1975 | Grass | 308/6 R |
| 3,951,377 | 4/1976 | Milroy | 308/6 R |
| 3,989,324 | 11/1976 | Traut | 308/200 |
| 4,056,292 | 11/1977 | Traut | 308/200 |
| 4,161,184 | 7/1979 | Traut | 137/98 |

Primary Examiner—Richard R. Stearns

[57] ABSTRACT

Simple linear bearings in which most sliding friction is eliminated. Two or more rollers which roll against each other and roll between parallel surfaces are prevented from moving away from each other by clips or springs connected between axial extensions on the two most distant rollers. The rollers have reduced-diameter "waists" which support a linear actuator in rolling contact.

1 Claim, 8 Drawing Figures

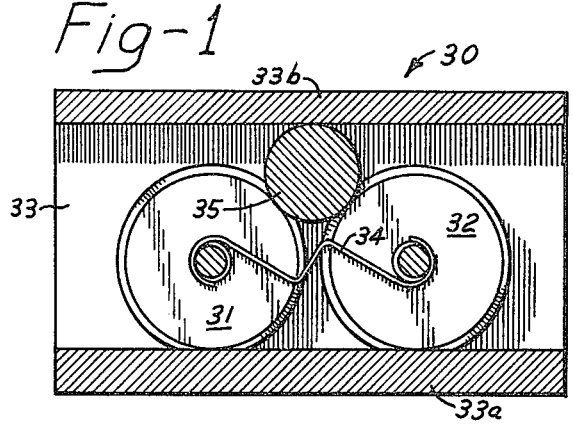
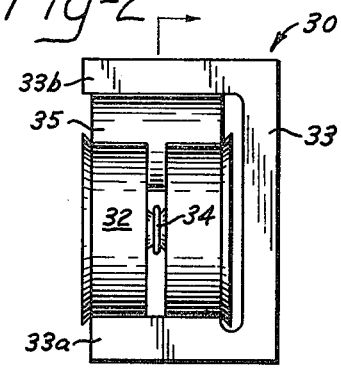
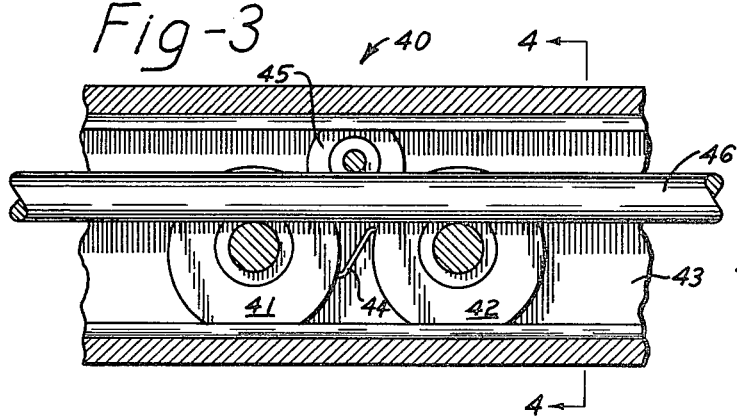
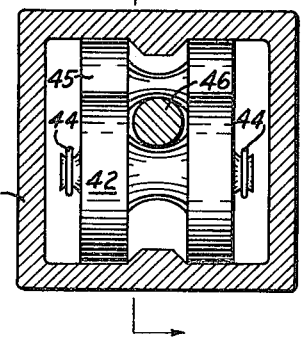
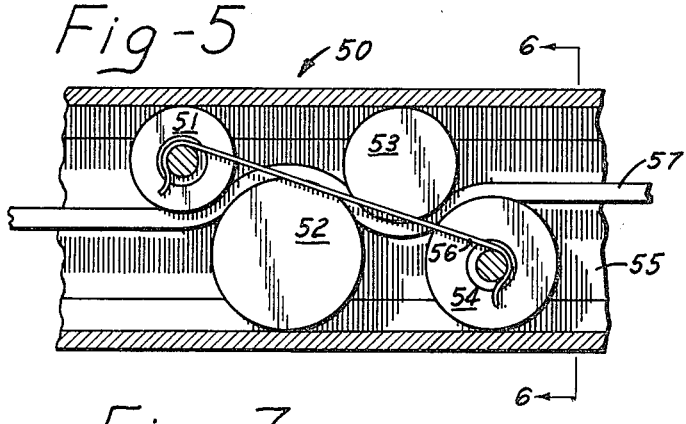
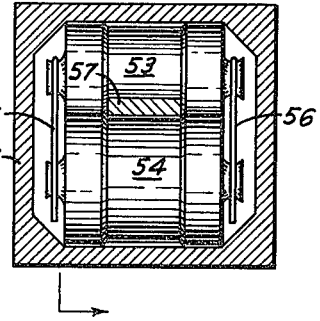
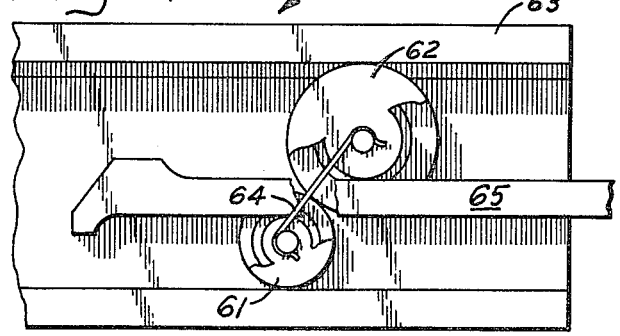
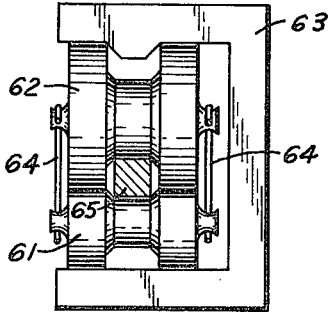

LINEAR BEARING DEVICES

RELATIONSHIP TO PRIOR APPLICATIONS

This application is related to the subject matter of application Ser. No. 822,093 filed Aug. 5, 1977 (now U.S. Pat. No. 4,161,184) and application Ser. No. 710,797 filed Aug. 2, 1976 (now U.S. Pat. No. 4,056,292), both naming Earl Traut as inventor. This invention also bears a definite relationship to my U.S. Pat. No. 3,989,324, entitled Rolling Contract Bearings.

BACKGROUND OF THIS INVENTION

1. Field of the Invention

This invention relates to that class of device involving elements which move in a linear direction in rolling contact.

2. Description of the Prior Art

Most low-friction linear bearings in use today utilize series of captive balls or rollers, or multiple ball bearings to guide elements in linear motion with respect to each other. Such devices include sliding friction between their rotating elements, utilize a multitude of elements, and are excessively complex.

SUMMARY OF THIS INVENTION

This invention relates to linear rolling contact bearings in which rollers are alternately positioned in rolling contact with the two parallel surfaces between which they are located and in rolling contact with adjacent rollers. There are two or more rollers; the first roller rolling against one of the linear surfaces and against the second roller. The second roller rolls additionally against the second linear surface and against a third roller. The third roller rolls additionally against the first surface and against a fourth roller, and so forth. The first and last rollers include axial extension; retaining springs or clips being connected between them to prevent the series of rollers from separating.

In at least one embodiment the rollers do not contact other rollers, but rather exert pressure upon the interposed linear actuator. All of the rollers have reduced-diameter central portions, or "waists", which support a linear actuator in rolling contact. There is no sliding friction, except between the axial extensions of the end rollers and their retaining clips or springs.

Accordingly, it is a primary object of my invention to provide simple linearly moving bearings in which all elements are in rolling-contact-only, as in my U.S. Pat. No. 4,056,292, except for the minor sliding friction between the retaining springs or clips and the axial extensions of the rollers.

It is another object of my invention to provide linear rolling contact bearings employing as few as six elements including housing and actuator.

These and other objects, features and advantages will be more apparent from a study of the appended drawings in which:

FIG. 1 is a sectional view of a linear rolling contact device having three rollers rolling between the flanges of a U-channel and having a spring connected between the reduced diameter central portions of the two most distant rollers.

FIG. 2 is a right end view of the device of FIG. 1.

FIG. 3 is a sectional view of a linear bearing similar to FIGS. 1 and 2 in which springs are connected between axial extensions on the ends of the two most distant rollers, all three rollers having waists to support a linear actuator rod.

FIG. 4 is a cross-sectional view of FIG. 3 taken along lines 4—4 and looking in the direction of the arrows.

FIG. 5 is a sectional view of a linear bearing similar to FIGS. 3 and 4 but having 4 rollers and having a flexible strap as a linear actuator.

FIG. 6 is a cross-sectional view of FIG. 5 taken along lines 6—6 and looking in the direction of the arrows.

FIG. 7 is a face view of a linear bearing similar to that of FIGS. 3 and 4 but having only two rollers and having portions of the two rollers and linear actuator rod broken away to show the contacts between the rollers and actuator.

FIG. 8 is a right end view of the bearing of FIG. 7.

DESCRIPTION OF THE PREFERRED EMBODIMENTS

Turning now to FIGS. 1 and 2, there can be seen linear motion device 30. Major rollers 31 and 32 are in rolling contact with linear surface 33a of U-channel 33 and are prevented from moving away from each other by retaining spring 34 which hooks onto their reduced-diameter centers. Separating roller 35 is in rolling contact with linear surface 33b of U-channel 33 and serves as separating means for preventing rollers 31 and 32 from moving towards each other.

Linear bearing 40 of FIGS. 3 and 4 is similar to Device 30, differing mainly in that a linear rod is placed between the major rollers and the retaining roller. Major rollers 41 and 42 are in rolling contact with the bottom inner surface of tube 43, which has a rectangular cross-section. Rollers 41 and 42 are prevented from moving away from each other by retaining springs 44 fastened to their axial extensions. Separating roller 45 is interposed in rolling contact between rollers 41 and 42 to prevent their moving towards each other, and is in rolling contact with the upper inner surface of tube 43. Rollers 41, 42, and 43 have reduced-diameter central portions, or "waists", to permit linear actuator 46 to be in rolling contact between them. Rolling contact will exist between the rollers and the linear actuator when the ratio of outer diameter to waist diameter is the same for each roller. Linear actuator 46 may have a slightly oversized diameter; the resulting lack of contact between roller 45 and the major rollers not affecting operation.

FIGS. 5 and 6 depict linear bearing 50 which is similar to linear bearing 40 except that four rollers of various diameters are used and the linear actuator is a flexible strap rather than a rigid rod. In FIGS. 5 and 6, rollers 51, 52, 53 and 54 are positioned to alternately make contact with the upper and lower inner linear surfaces of rectangular cross-sectioned tube 55. Note that every other roller is in rolling contact with one of the linear surfaces and that the other rollers contact the other linear surface. These rollers additionally are in rolling contact with linear actuator strap 57, but not necessarily with each other. Retaining clips 56 are rigid and have little or no spring action, and are fastened between axial extensions on rollers 51 and 54, the two most widely separated rollers. As in bearing 40, each roller has the same ratio of major diameter to waist diameter.

Device 60 of FIGS. 7 and 8 is similar to FIGS. 5 and 6 but uses only two rollers and has a rigid linear actuator. In device 60, roller 61 is in rolling contact with the lower flange of U-channel 63 and roller 62 is in rolling contact with the upper flange of U-channel 63; rollers 61 and 62 also being in rolling contact with each other. Retaining clips 64 prevent rollers 61 and 62 from moving away from each other. Linear actuator 65 is in rolling contact with the waists of rollers 61 and 62, their waist diameters being proportional to their major diameters.

No support is shown in FIGS. 7 and 8 for the right end of actuator 65. This end would be supported by another linear bearing or would be attached to another portion of the overall mechanism.

It should be noted in device 60 that instead of clips 64, any other kind of spring could be used as retaining means, including rings as in FIGS. 4 or 6 of my U.S. Pat. No. 4,056,292. However, even with such retaining rings there will still be sliding friction thereat because rollers 61 and 62 roll in opposite directions.

I claim:

1. A linear rolling contact bearing comprising:
two linear surfaces,
said linear surfaces being parallel and joined to each other,
rotating means,
said rotating means including a plurality of rollers,
said rollers being located between said linear surfaces,
every other said roller being in rolling contact with one of said linear surfaces,
all other said rollers being in rolling contact with second said linear surface,
first and last of said rollers including axial extensions,
retaining means,
said retaining means being connected between said axial extensions to prevent said rollers from moving apart,
a linear actuator,
said rollers having waists upon which said linear actuator rolls,
the thickness of said linear actuator and the thickness of the waists of said rollers preventing adjacent said rollers from contacting each other.

* * * * *